United States Patent Office 3,492,598
Patented Jan. 27, 1970

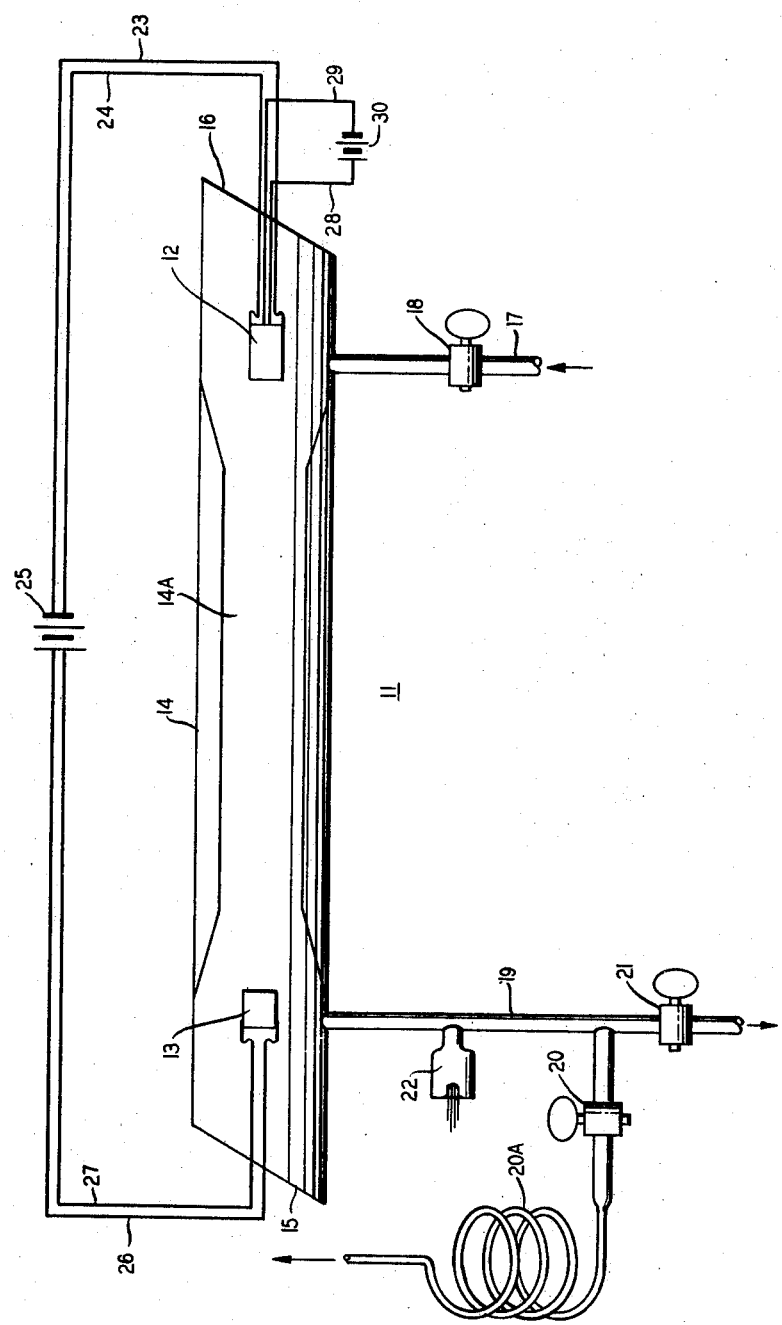

3,492,598
METHOD FOR PROCESSING GAS DISCHARGE DEVICES
Donald MacNair, Berkeley Heights, N.J., assignor to Bell Telephone Laboratories Incorporated, Murray Hill, N.J., a corporation of New York
Filed Aug. 24, 1967, Ser. No. 662,975
Int. Cl. H01s 3/22
U.S. Cl. 331—94.5      5 Claims

ABSTRACT OF THE DISCLOSURE

Processing of gas discharge devices including a cathode member initially having an alkaline earth carbonate emissive coating may be effected in a dynamic system at atmospheric pressure in the presence of an inert gaseous medium.

---

This invention relates to a technique for processing gas discharge devices.

More particularly, the present invention relates to a technique for processing gas discharge devices including cathode elements capable of operating in non-oxidizing inert gaseous media.

Recently, considerable interest has been generated in the electronics industry in laser devices which operate in a non-oxidizing inert gaseous ambient. In the operation of such devices, it is conventional to employ a thermionic cathode element capable of performing at high current levels for the purpose of ionizing the gaseous medium.

The cathode structures presently marketed for this purpose are generally the well known coated cathodes which typically comprise a nickel base having a coating of an alkaline earth metal oxide formed during a preliminary processing stage by decomposition of the corresponding carbonate. More recently, a hollow-cathode structure designed for use in the noted lasers was described in copending application, Ser. No. 627,351, filed Mar. 31, 1967, by D. MacNair. The structure described therein includes an emissive coating comprising an alkaline earth oxide or, in the alternative, a mixture of barium zirconate and an alkaline earth oxide upon a nickel screen contained in a hollow cylindrical geometry.

Heretofore, the processing of assembled tubes of the type described above has been effected in a two-stage process, the alkaline earth carbonates being first reduced to their respective oxides by vacuum heating and the structure subsequently activated by drawing current. In brief, this procedure involves sealing the element on a vacuum stage which is evacuated to a pressure of the order of $10^{-6}$ torr and subsequently heating the cathode to a temperature of 950° C. until the carbonates are converted to the corresponding oxides, as indicated by a sudden pressure drop in the chamber. Thereafter, the temperature of the system is reduced to the operating temperature, a suitable inert gas admitted to the system and discharge initiated, the carbon dioxide resulting from the reduction of the carbonates being pumped out of the system. This procedure is repeated statically several times until the system is devoid of contaminants.

Although satisfactory emission is attainable by the use of such techniques, cathode deactivation is a common problem and the economic strain of sophisticated pumping equipment is burdensome. Accordingly, workers in the art have focused their interest upon these difficulties.

In accordance with the present invention, the prior art problems are effectively obviated by means of a novel processing technique wherein contamination of the cathode structure is avoided and the necessity for costly pumping equipment is eliminated. The inventive technique involves connecting a gas tube or laser, including a cathode member initially bearing a carbonate coating to a dynamic system wherein an inert gas is permitted to flow at atmospheric pressure and heating the cathode member to a temperature sufficient to reduce the carbonate to the corresponding oxide, the liberated carbon dioxide being flushed from the system by the flowing gas. Following, discharge may be initiated and the tube or laser operated.

The invention will be more readily understood by reference to the following detailed description taken in conjunction with the accompanying drawing, wherein the figure is a schematic representation of an exemplary gas laser system processed in accordance with the present invention.

With further reference now to the figure, there is shown a gas laser system 11, including a cathode member 12, initially comprising an alkaline earth carbonate emissive coating and an anode member 13. Cathode 12 and anode 13 are both shown connected hermetically to glass tube 14 having a hollow bore 14A and a pair of optically polished Brewster angle windows 15 and 16, gas inflow means for introducing an inert gas through conduit 17 controlled by valve 18 into the system, gas outflow means for removing gas from the system via conduit 19 controlled by valve 20 and venting it to the atmosphere via resistance tubulation coil 20A, and means for permitting gas to be pumped from the system by a cryogenic or mechanical pump (not shown) controlled by valve 21. The system is also provided with a thermocouple gauge 22 for determining the pressure in the system. Cathode 12 is connected by means of paired electrical leads 23 and 24 to the negative pole of a D-C source 25, anode 13 being connected by means of paired electrical leads 26 and 27 to the positive pole of D-C source 25. Paired electrical leads 28 and 29 are connected to a D-C source 30 for the purpose of heating cathode 12.

In the operation of the process, valve 21 is closed and valves 18 and 20 opened to permit the introduction and exit of an inert gas through the system at atmospheric pressure. After flushing the system for several minutes to remove air, and with the gas flowing, the cathode member is heated to approximately 900° C. and flash heated at 950° C. for several minutes to convert the alkaline earth carbonates in the emissive coating to the corresponding oxides. Thereafter, the cathode is cooled to room temperature, valves 20 and 18 closed, and valve 21 opened, the system being pumped to the operating pressure. As this point is neared, valve 18 is slowly opened and an inert gas admitted, the pressure being maintained at the operating level. Next, the cathode member is heated to operating temperatures with the gas flowing and discharge initiated, so resulting in ionization of the gaseous medium, the radiation developed within the discharge plasma passing through windows 15 and 16.

For the purposes of the present invention, it will be understood that the inert gas as utilized herein may be selected from among argon, krypton, neon, helium, xenon, nitrogen, or any nonoxidizing gaseous medium which does not react with the emissive coating. It will also be understood that the described technique is applicable to any conventional cathode structure including an emissive coating containing an alkaline earth compound. Such coatings usually contain a barium compound which will break down on a vacuum station to yield barium oxide. Suitable materials include the single carbonate material, barium carbonate, the double carbonate material co-precipitated barium-strontium carbonate, and the triple carbonate material barium-strontium-calcium carbonate. The double carbonate material most commonly available for this purpose is a co-precipitant of equimolar portions of barium carbonate and strontium carbonate.

In order that those skilled in the art may more fully understand the inventive concept herein presented, the following example is given by way of illustration and not limitation.

EXAMPLE

A hollow cathode element was prepared as follows:

A flat sheet of 220 nickel, .005 inch x 1 inch x 1⁵⁄₁₆ inch was selected as the base member, and a 220 nickel screen 60 x 60 mesh was selected as a screen member, each being obtained from commercial sources. The nickel sheet and the nickel screen were then vapor degreased and cleaned ultrasonically by conventional techniques utilizing trichloroethylene. Next, the base and screen were rinsed in acetone and the screen welded to the nickel sheet by conventional welding procedures. Thereafter, 0.3 gram of a mixture comprising carbonyl nickel, 2 percent, by weight, zirconium hydride and 2 percent nitrocellulose, by weight, was deposited in the pores of the screen to the upper level thereof, and the resultant structure sintered at 1100° C. for two hours in hydrogen, thereby binding the powder to the back or base member and the screen. The resultant structure was then cooled and welded into a ⅜ of an inch diameter cylinder. An emitting mixture was prepared by mixing 50 grams of co-precipitated barium-strontium carbonate with 15 cm.$^{-3}$ nitrocellulose solution and 15 cm.$^{-3}$ of amyl acetate for 50 hours in a conventional ball mill. 0.2 gram of the resultant mixture was next forced into the porous base by conventional techniques until the pores within the nickel screen were filled. The filled structure was then heated to 200° C. in air for 15 minutes to remove the binder. Next, the resultant structure was mounted in a hollow cylinder including a retaining cap and welded thereto. Then, the structure was mounted in another hollow cylinder and electrical leads attached to the various elements of the structure. Thereafter, the structure was mounted in a laser envelope of the type shown in the figure. Following, valve 21 was closed and valves 18 and 20 opened and adjusted so that high purity argon (99.996 percent) flowed through the system at approximately 3–5 liters per minute at atmospheric pressure. After flushing the system for 5 minutes, heater power was applied to the cathode. After 15 minutes, the temperature, as indicated by a pyrometer, was 750° C., and after an additional 30 minutes a temperature of 900° C. was attained. At this point, the cathode was flash heated to 950° C. and held for 5 minutes. Then, the cathode was cooled to room temperature and valves 18 and 20 closed. The system was then pumped by opening valve 21 to the mechanical pump and valve 18 slowly opened so that the system pressure was maintained at about 1 torr. With the pressure at 1 torr and argon flowing through the system, the cathode was heated to 850° C. and a difference of potential applied between the cathode and the anode. After several minutes of operation, the current was increased to 5 amperes, the pumping of undesirable gases continuing until the full current capacity of the laser was attained. After 10 minutes of running the discharge with gas flowing, the system was fully cleansed as indicated by the color of the discharge.

It will be appreciated by those skilled in the art that the main impact of the present invention resides in the discovery that the vacuum and static processing techniques heretofore utilized for processing gas discharge devices and lasers may be replaced by a novel dynamic process conducted at atmospheric pressure, so resulting in the elimination of ion and diffusion pumps and the rapid cleansing of the systems of interest.

What is claimed is:

1. A method for processing a gas discharge device comprising a discharge tube having gas inlet and outlet means, an anode and including a cathode member having an emissive coating initially comprising an alkaline earth carbonate, the method comprising the steps of (a) thermally decomposing said carbonate to the corresponding oxide and evolved carbon dioxide, flowing an inert gaseous medium through said tube; at atmospheric pressure, (b) flushing the carbon dioxide from the system by continuing the flow of said inert gaseous medium, reducing the pressure in the tube to a desired operating level and (c) initiating a discharge in said device through said gaseous medium.

2. A method in accordance with claim 1 wherein said device is processed to provide stimulated emission from said gas.

3. A method in accordance with claim 1 wherein said step of flowing comprises flowing argon gas as said gaseous medium.

4. A method in accordance with claim 2 wherein said step of flowing comprises flowing argon gas as said gaseous medium.

5. A method in accordance with claim 2 wherein said method comprises the initial step of forming a hollow cathode and coating said cathode with barium-strontium carbonate.

References Cited

UNITED STATES PATENTS 2,002,767   5/1935   Erickson _____ 316—22
2,284,036   5/1942   Bol _____ 316—22

RONALD L. WIBERT, Primary Examiner

U.S. Cl. X.R.

316—111; 316—22